United States Patent [19]

Yamamoto

[11] Patent Number: 5,430,828
[45] Date of Patent: Jul. 4, 1995

[54] ARITHMETIC AND LOGIC UNIT, STORAGE UNIT AND COMPUTER SYSTEM FOR FUZZY SET PROCESSING

[75] Inventor: Sozo Yamamoto, Osaka, Japan

[73] Assignee: Matsushita Electric Industrial Co., Ltd., Osaka, Japan

[21] Appl. No.: 80,179

[22] Filed: Jun. 21, 1993

[30] Foreign Application Priority Data

Jun. 26, 1992 [JP] Japan .................................. 4-168796
Nov. 9, 1992 [JP] Japan .................................. 4-298741

[51] Int. Cl.⁶ .............................................. G06F 9/44
[52] U.S. Cl. .......................................... 395/3; 395/51; 395/61; 395/900
[58] Field of Search ................. 395/3, 51, 54, 11, 61, 395/900

[56] References Cited

U.S. PATENT DOCUMENTS 4,860,214 8/1989 Matsuda et al. ..................... 395/61
4,875,184 10/1989 Yamakawa .............................. 395/3
5,012,430 4/1991 Sakukai ................................. 395/61

OTHER PUBLICATIONS

The design of a RISC based multiprocessor chip Gupta et al. IEEE/12-16 Nov. 1990.
Operation method in Fuzzy set operation processor Katsumata IEEE/14-16 Oct. 1991.
Generating Fuzzy rules by Learning from Examples Li-Xin Wang et al. IEEE 13-15 Aug. 1992.
Modelling and simulation of a parameterized fuzzy processor Chen et al. IEEE/10-13 May 1992.
Intelligent Control of a Flying Vehicle Using Fuzzy Associative Memory System Yamaguchi et al. IEEE/8-12 Mar. 1992.

Primary Examiner—Allen R. MacDonald
Assistant Examiner—Richemond Dorvil
Attorney, Agent, or Firm—Beveridge, DeGrandi, Weilacher & Young

[57] ABSTRACT

A device having a calculation part and memory part which can directly deal with a word of a fuzzy set data type, that is, which can deal with a combination of an element and a grade corresponding to the element, to thereby obtain high speed general calculating ability for fuzzy sets. The calculation part has a grade operating unit and an element operating unit, and the data is input and output in a word type such that it has an element field and a grade field which are processed by the corresponding operating unit. The memory part is an associative type memory in which a search can be executed using an element as a key, and which, at a data writing, compares new data and stored data and stores the result of the comparison. Alternatively, the memory part can realize fuzzy set calculation under the same procedure as data transfer by using a function to execute fuzzy logical calculations on the memory module in addition to data transfer, to thereby obtain very high speed calculating ability for fuzzy sets.

23 Claims, 13 Drawing Sheets

ARITHMETIC AND LOGIC UNIT, STORAGE UNIT AND COMPUTER SYSTEM FOR FUZZY SET PROCESSING

BACKGROUND OF THE INVENTION

1. Field of the Invention

This invention relates to a computer system and elements thereof in which each of the elements of a computer, particularly a CPU (central processing unit) and a memory are altered so as to directly process a data structure suitable for a fuzzy-set representation to enable both a fuzzy-set operation and an operation based on an extension principle for the fuzzy set to be carried out at high speed.

2. Related Art of the Invention

Through development of the application of a fuzzy theory, a fuzzy inference processing has been generally promoted to be implemented using a hardware structure (as disclosed in "Digital Fuzzy Circuit" of Japanese Laid-open Patent Application No. 2-224029). However, just the execution of the fuzzy inference does not fully cover a broad application containing learning of an inference rule and a membership function and a processing of a numerical operation, and thus a more general operation has been required to be processed at high speed.

As an operation (calculation) contained in the processing based on the fuzzy theory have been known as a fuzzy-set operation and an operation based on the extension principle, and it is required to execute these operations at high speed. On the other hand, in order to implement both a high-speed performance and a wide use, there have been proposed a method of combining a CPU and a circuit which is exclusively used for the fuzzy inference, and a method of adding an instruction set of a widely-used CPU with a maximum value operation (Max) and a minimum value operation (Min) (for example, in papers of "Proc. of the international Fuzzy Engineering Symposium 91", pp 387–398).

The fuzzy set operation is a calculation of a fuzzy set in terms of a set. Specifically, grade values for the same element of two fuzzy sets are calculated, for example. Assuming that $<$s-op$>$ represents a fuzzy set operation of executing an operation $<$op$>$ for grades, G$<$s-op$>$H for G$=\Sigma$gx/x and H$=\Sigma$hy/y(x$=$y) is calculated as G$<$s-op$>$H$=\Sigma$(gx$<$op$>$hx)/x.

If the number of elements is n, the operation is carried out n-times. This kind of operation is frequently used in an algorithm of a fuzzy inference mainly using a Max-Min operation, and the following construction is effectively used. In the fuzzy inference using the Max-Min method, the execution of the inference is basically based on an operation of repetitively carrying out the maximum value operation and the minimum value operation between a fuzzy set given as an input and a fuzzy set constituting a rule in turn. In the system, as shown in FIG. 5, the fuzzy set can be represented by a format in which grade values are aligned in a serial number. The execution of the inference is originated to the successive execution of the maximum value operation and the minimum value operation between the grade values thus represented.

The structure of a conventional memory is shown is FIG. 3. An address buffer 101, a column decoder 102 and a row decoder 103 serve to decode an address given to an address terminal 122, and specify an address in a memory cell array 104. In order to control flow of data, an input data control 111 and an output data control 112 are provided to control data flow between the memory cell array 104 and the data input/output terminal 121 through a sense switch 105. A control unit 115 interprets a control signal which is given to a chip select terminal 123 and a write-enable terminal 124 to control the input data control 111 and the output data control 112. The operation of the control unit is carried out as shown in a table 1.

TABLE 1

| CS | WE | Input Data Control | Output Data Control |
|----|----|--------------------|----------------------|
| H  | *  | —                  | —                    |
| L  | H  | Disable            | Enable               |
| L  | L  | Enable             | Disable              |

That is, when the chip select terminal 123 is supplied with "L" and the write-enable terminal 124 is supplied with "H", a read-out mode is set, and the input data control is in a disable state and the output data control is in an enable state. Through this operation, the content of a specific address of the memory cell array 14 is output to a data input/output terminal 121. Further, when the chip select terminal 123 is supplied with "L" and the write-enable terminal 124 is supplied with "L", a write-in mode is set, and the input data control is in an enable state and the output data control is in a disable state, so that the data supplied to the data input/output terminal 121 is stored in the memory cell array 104. The operation is not effectively operated when the chip select terminal 123 is supplied with "H".

The operation flow of the computer thus constructed using the conventional memory will be described with reference to FIG. 4.

In a case of performing the fuzzy set operation, two elements of the fuzzy set are picked up from the memory (1),(2), and these elements are stored into the register of the CPU to execute predetermined operations such as the minimum value operation, the maximum value operation, etc. (3). The operation result is stored into another address (4) to complete one operation.

The minimum value operation and the maximum value operation are not equipped to a general CPU. Therefore, generally, the maximum value operation and the minimum value operation are executed by combining a comparison instruction and a branching instruction. Three instructions are required, including a loading of data to the CPU register. If adding the maximum value operation (MAX) and the minimum value operation (MIN) are added to the instruction set of the CPU to execute the fuzzy operation at high speed, the maximum value operation and the minimum value operation could be carried out with one instruction, and thus the fuzzy logical operation can be executed at high speed.

The above implementation is considered on the basis of the fuzzy inference. However, the fuzzy theory may be applied not only to the fuzzy inference, but also to various fields such as an application to OR, a blending with an expert system, etc. In these fields are contained not only the fuzzy set operation, but also an operation based on the extension principle operation in which the fuzzy set serves as a number. The extension principle operation is defined as follows. Assuming that $<$e-op$>$ represents the extension principle operation of executing an operation $<$op$>$ for an element, and G$=\Sigma$gx/x, H$=\Sigma$hy/y, $G <e\text{-}op> H = \Sigma(gx \min hy)/(x<op>y)$.

In the operation based on the extension principle, the element and grade operations are required to be executed for all combinations of the elements of the two fuzzy sets, and the operation amount is increased in second-power order. In the method of adding the maximum value operation and the minimum value operation to the instruction set of the widely-used CPU, the part of the grade operation can be executed at higher speed than an operation by an ordinary CPU.

However, the following problems exist in the conventional construction as described above. That is, in the fuzzy set operation, it is required that the input data be transmitted to a fuzzy set processing unit and the output data be transmitted to the memory, so that a memory access must be executed three times for one fuzzy logical operation. Therefore, even when the instruction of the for maximum value operation and the minimum value operation is added to the CPU, the total processing speed of the computer system is restricted by the data transmission capability between the memory and the CPU.

Further, in the operation based on the extension principle, the following two problems exist, and thus the high-speed effect is not sufficiently attained in the computer system having the construction as described above. One problem resides in that the operation for the elements and the operation for the grades are serially executed by one CPU. No mutual dependence exists between the element operation and the grade operation, and these operations can be originally executed simultaneously with each other.

The other problem resides in data transfer between the memory and the CPU, and the storage of data into the memory. Ordinarily, the representation of the fuzzy set on the computer is made so that the position of data is uniquely specified in accordance with the element. In a case where the grade and the element are represented with separate data, the storage of the operation result is carried out in accordance with the following steps.

An element is specified, and a grade corresponding to the element is read out.
If there exists a corresponding grade,
 the maximum value of the read-out grade and a new grade is calculated, and
 the read-out grade is renewed to the maximum value.
If not,
 the element and the grade are newly stored.

As shown in FIGS. 1 and 2, this operation must be repetitively carried out, and it is required for all combinations of the elements particularly in the operation based on the extension principle, so that a long operation time is required.

SUMMARY OF THE INVENTION

This invention is intended to solve the above problems of the prior art. One object of this invention is to make a format for data to be processed on a computer suitable for fuzzy set representation, and to enable high-speed execution of a fuzzy set operation and an operation based on an extension principle for a fuzzy set by altering an arithmetic and logic unit, a memory, etc. in accordance with the format, and keep the matching with parts which execute calculations other than the fuzzy sets.

The other object of this invention is to reduce overhead time due to data transmissions by adding a fuzzy logical operating function to a memory itself so that a fuzzy set operation, which is frequently used for fuzzy inference and required to be executed at high speed, can be executed at high speed, thereby implementing a high-speed fuzzy set operation.

In order to attain the above objects, according to this invention, a word comprising a pair of an element in the universal set of a fuzzy set and a grade corresponding to the element is generally used as an unit in a representation format for representing the fuzzy set. This word is used as an unit for storage, communication and processing of data on the computer, and the data input/output in an arithmetic and logic unit for fuzzy sets and storage into the memory are carried out using the word as an unit. Inside of the arithmetic and logic unit for a fuzzy set, the word is shared between a grade operation unit and an element operation unit, and these units execute their operations in accordance with instructions given thereto. The input/output from and to the memory is carried out using a word comprising a pair of the element and the grade as an unit, and the memory is so designed that identity for the element is kept in a predetermined part of the memory.

In order to execute the fuzzy set operation at higher speed, a part of the memory is provided with a register and a logical operation unit therein to carry out a logical operation between the content of a given address of the memory cell and data which is newly given to the data input/output terminal, and the result of the logical operation is stored into the pertinent address of the memory cell again.

Under the constitution of the present invention, the grade corresponding to the element of the universal set in the fuzzy set is represented as a word, and the constituting elements of the computer, particularly the arithmetic and logic unit and the memory are so designed to be suitable for operations with this type of word, whereby the operation for the fuzzy set for which plural instructions have been required to be executed in the conventional computer structure can be executed using a single instruction. For the input/output of the memory, the read-out and write-in processing for which plural instructions have been conventionally required because the element and the grade are separated from each other can be executed by issuing only one instruction, and thus a execution time can be extremely shortened. Therefore, a high-speed fuzzy set operation can be carried out.

Further, by adding the logical operation function to the memory unit for the fuzzy set operation, the logical operation result between data which has been already stored and data which is newly supplied as a write-in data can be stored at a specified address. Accordingly, the fuzzy set operation can be carried out using the substantially same proceedings as the memory transmission, so that the high-speed fuzzy set operation can be implemented with a simple construction. A binomial fuzzy set operation for which three-times memory access and an operation in the CPU are required for every grade can be processed by only two memory transmission proceedings. Therefore, the load of the central processing unit can be depressed, and the whole operation speed can be heightened. Since the logical operation unit can be controlled from outside, it can be switched to a fuzzy set operation such as a sum operation, a product operation, etc.

PREFERRED EMBODIMENTS

A fuzzy set processing operation unit of a first embodiment of this invention will be described with reference to the accompanying drawings.

First, the representation of a fuzzy set on a computer is described. For example, providing a fuzzy set {0.2/2, 0.7/3, 1/4, 0.4/5} (grade of 0.2 for element of 2, grade of 0.7 for element of 3, etc.), in the representation on the conventional computer, an universal set is set to {1,2,3,4,5,6,7}, and a matrix of a grade corresponding to each element is stored in a form of {0,0.2,0.7,1,0.4,0,0}. This is because when executing the fuzzy set operation, no element is required to be referred to and it is more effective by referring to only the values of the grades. However, in operations based on the extension principle, both the element and the grade must be an object of operation Accordingly, a fuzzy set F is represented as comprising several words, and represented as F={w(1), w(2), ..., w(1)}, ={g(i)/e(i)}.

Figure 6:
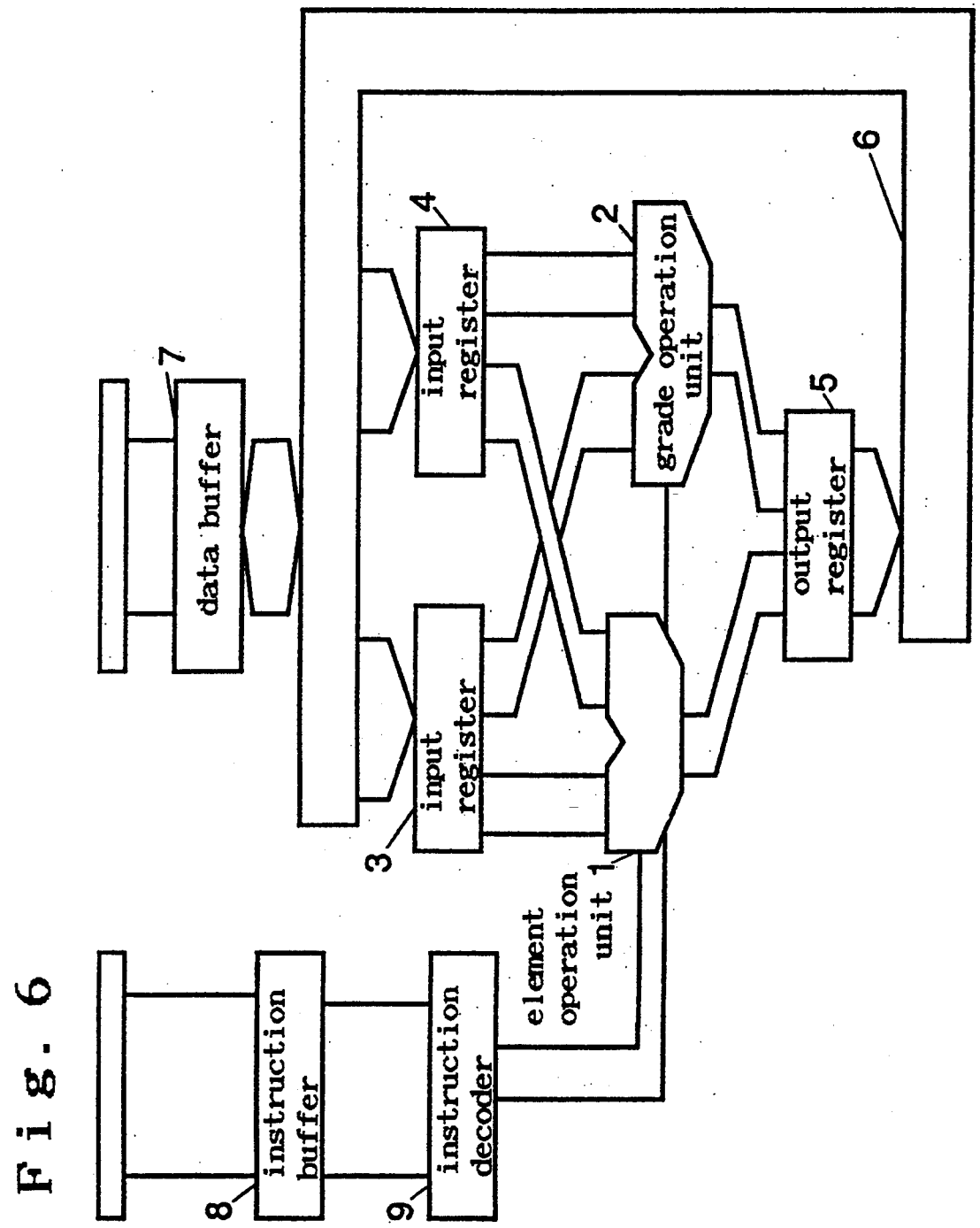
FIG. 6 is a block diagram of the inner construction of a fuzzy set operation unit according to a first embodiment of this invention.

In the operation unit, the input data is divided in terms of fields, and shared between the grade operation unit and the element operation unit which execute the respective operations in accordance with the given instructions. The construction of the inside of the operation unit will be hereunder described with reference to FIG. 6.

The main elements for executing operations are the element operation unit 1 and the grade operation unit 2, and each of these units corresponds to an operation unit of an ordinary operation unit. Data to be processed in both of the operation units are input to the input register 3 or 4 or an internal register (not shown). The data of the output register is output to the outside through an internal data bus 6 and a data buffer 7 again. In the data buffer 7, the internal data bus 6, and the input registers 3 and 4 and the output register 5, a word in which an element and a grade are aligned with each other is used as an unit. For example, assuming this word to be 16 bits, 8 of these bits are allocated to an element field, and the residual 8 bits are allocated to a grade field. The data transmission is carried out using the word comprising the combination of the element and the grade as an unit. In the operation unit, the element field and the grade field are subjected to the operations in the element operation unit 1 and the grade operation unit 2, respectively, so that the input registers 3 and 4 and the output register 5 have the function of decomposing and synthesizing words. For example, assume that data supplied to the input register 3 is wa={ga/ea} (indicating that the element field of a word wa is ea, and the grade field is ga) and data supplied to the input register 4 is wb={gb/eb}. At this time, the element operation unit 1 is supplied with each of ea and eb as an operand, and the grade operation unit 2 is supplied with ga and gb. Both of the operation units execute the operations as described below, and output respective results to the output register. Assuming the operation result of ea and eb in the element operation unit 1 to be ec, and assuming the operation result of ga and gb in the grade operation unit 2 to be gc, wc={gc/ec} is output to the output register 5. The whole width of the word is preferably set to 16 bits, 32 bits or the like to effectively carry out the data transmission to the external storage unit.

The whole construction containing the internal data bus 6, the element operation unit 1 and the grade operation unit 2 is controlled in accordance with a given instruction from external to the operation unit through the instruction buffer 8. This instruction is interpreted by an instruction decoder 9, and the interpreted result is supplied to each part and controlled. The operation of this embodiment will be hereunder described.

Here, a case where an operation based on the extension principle is carried out between two fuzzy sets will be described.

Fuzzy sets to be operated an are represented by FA and FB, and an operation result is stored in the name of FC. A is presented as FA={wa(1),wa(2), ..., wa(1)}, w(i)={ga(i)/ea(i)}, and FB and FC are represented in the same form. Generalizing the representation, the kind of an operation is represented by <op> and an operation applying <op> to elements of the fuzzy sets by the extension principle is represented by <e-op>.

Therefore, the operation to be executed is represented by FC=FA <e-op> FB, and this is actually executed as follows:

$$FC = FA <\text{e-op}> FB \qquad \text{[Equation 1]}$$

$$= \sum_{i=1}^{l} \sum_{j=1}^{m} (ga(i) \min gb(j))/(ea(i) <op> eb(j))$$

Using the representation with the words of this embodiment, the equation corresponds to the following equation:

$$FC = FA <\text{e-op}> FB = \sum_{i=1}^{l} \sum_{j=1}^{m} wa(i) <\text{e-op}> wb(j) \qquad \text{[Equation 2]}$$

In this embodiment, this wa(i) <e-op> wb(j) is received as an instruction. First, data is read from the external data bus through the data buffer 7. wa(i) and wb(j) are stored into the input register 3 and the input register 4, respectively. Subsequently, the element operation unit and the grade operation unit 2 operate the data supplied to the input register. The kind of the operations which are executed in both of the operation units are given from the instruction decoder. Here, since the extension principle operation is specified, the element operation unit 1 is supplied with <op> to execute an operation of ea(i) <op> eb(j), and the grade operation unit 2 is supplied with min to execute an operation of ga(i) min gb(j). These two operations are simultaneously carried out, and these results are stored into the output register. Finally, the operation result is output through the data buffer to the external data bus. Therefore, only one operation is needed to process the word, while two operations are required for the element and the grade in the conventional computer.

Figure 1:
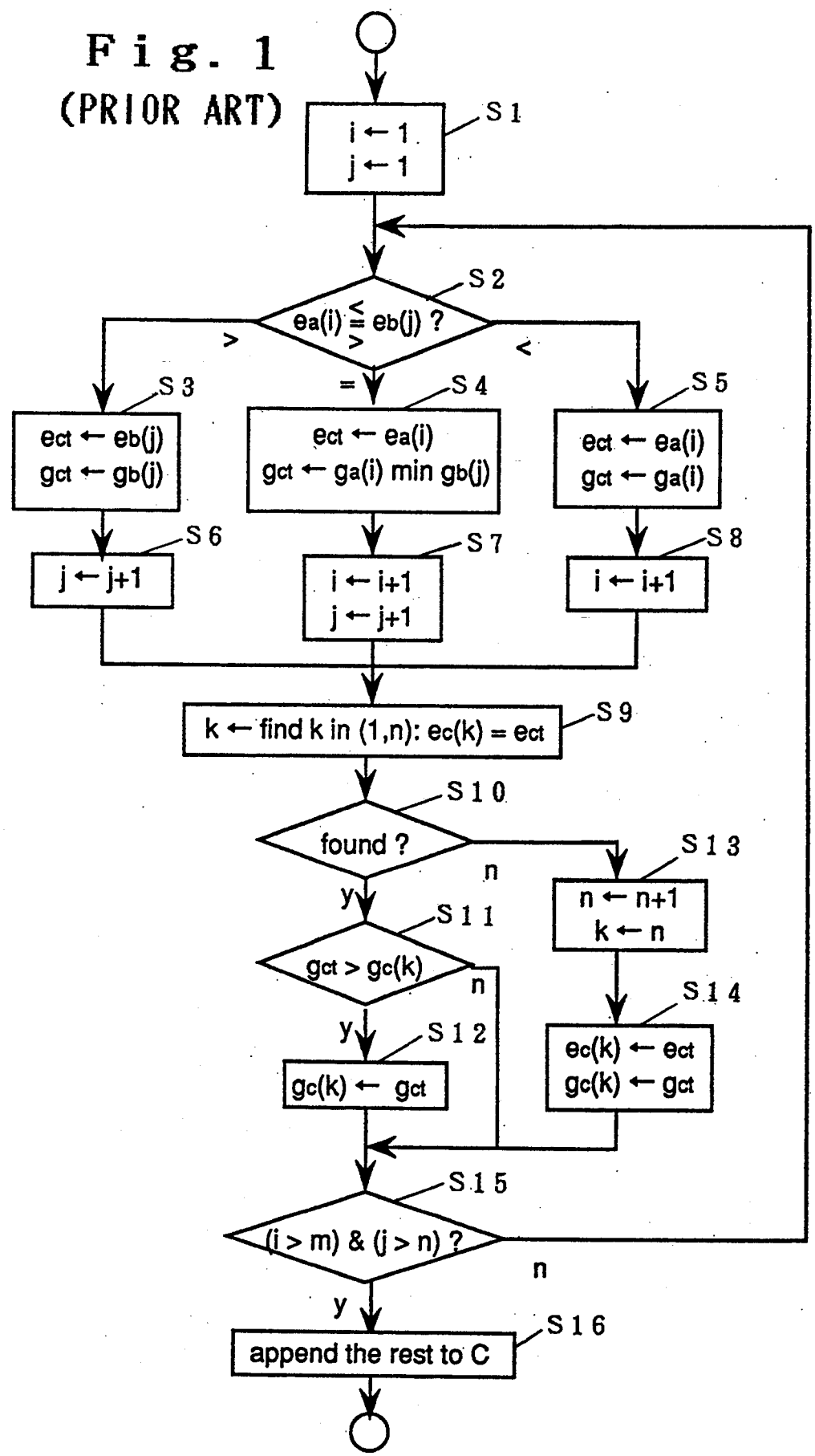
FIG. 1 is a flowchart for the fuzzy set operation of a conventional computer.
Figure 2:
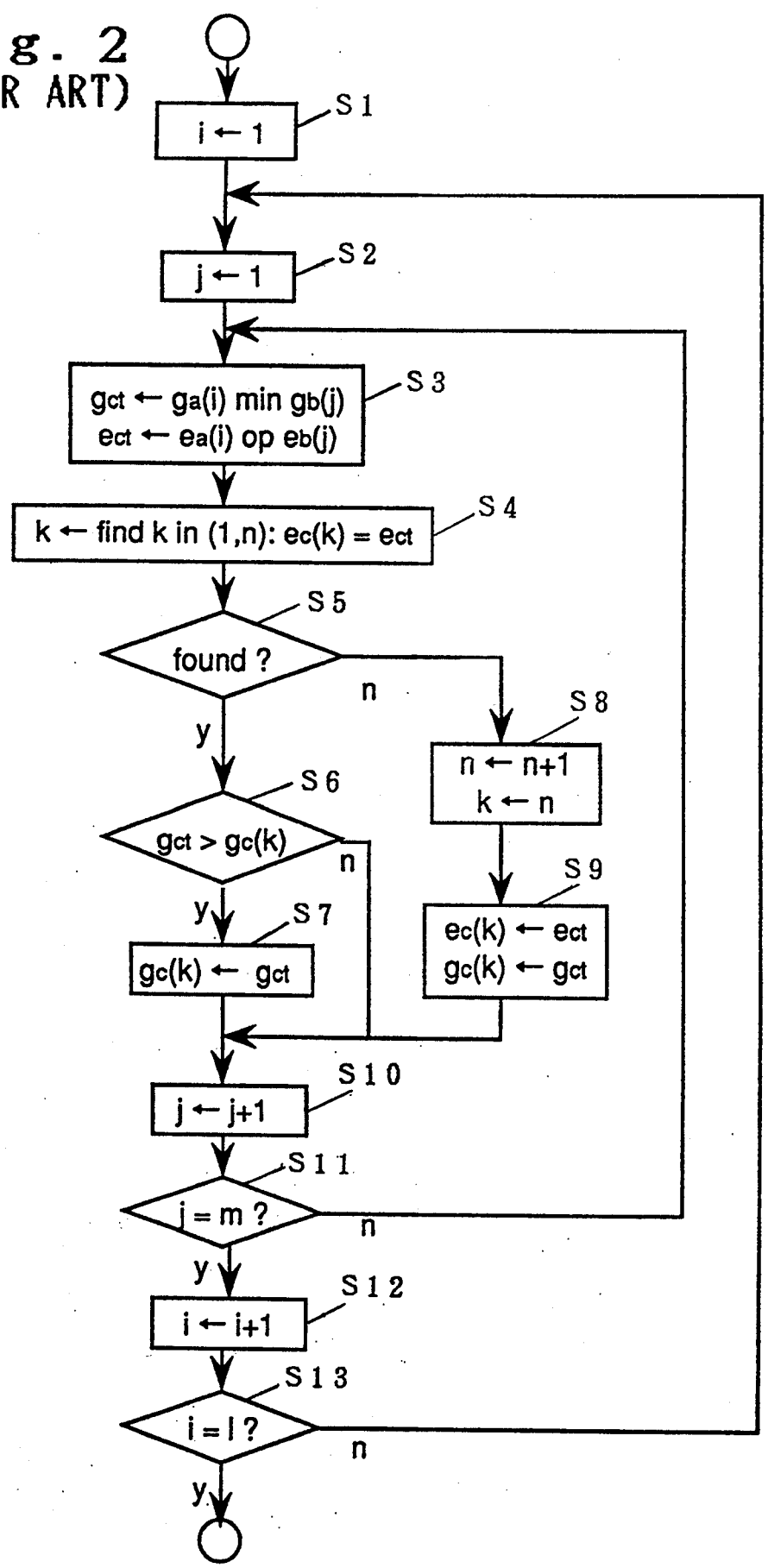
FIG. 2 is a flowchart for the extension principle operation of the conventional computer.

With respect to fuzzy set operations, there are different effective methods in accordance with the representation manner of the fuzzy set on a memory. In the conventional computer, on the assumption that the pairs of the elements and the grades of the fuzzy set are aligned in order of elements, an algorithm as shown in FIG. 1 is usable. In this method, elements of the two fuzzy sets are compared from the heads thereof, and if the same elements are found, the min operation is carried out, while if the same elements are not found, the data is added to a new fuzzy set. According to this method, there is obtained a merit that a search of picking up elements from fuzzy sets may be carried out in order of (l+m) (l, m represent numbers of the elements of the fuzzy sets).

Figure 13:
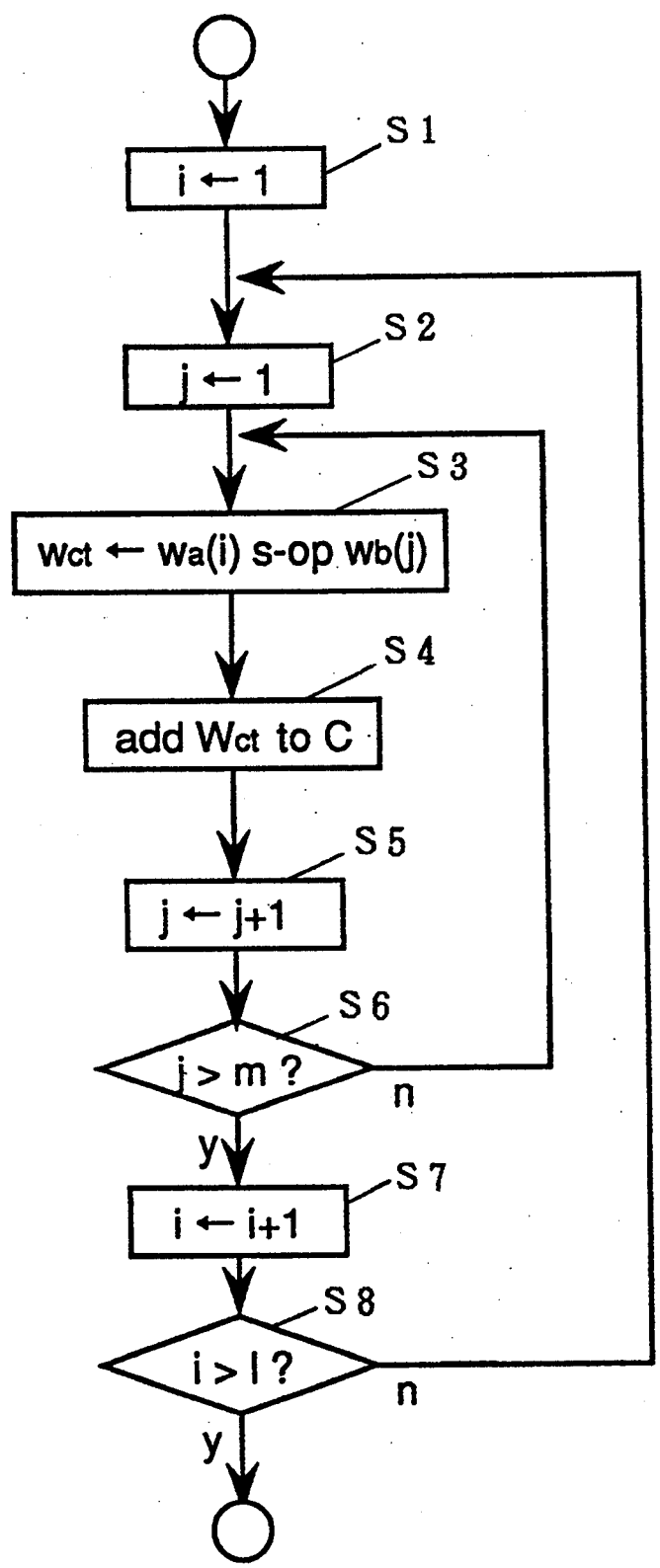
FIG. 13 is a flowchart for a fuzzy set operation of a computer of the sixth embodiment.

On the other hand, in the fuzzy set operation unit of this embodiment, an algorithm as shown in FIG. 13 is suitable. This is basically identical to the algorithm of the extension principle operation, and only the operations of the respective operation units are different. The order of the calculation amount is (l*m), however, and this method is effective because an operation of adding a calculation result to a new fuzzy set can be carried out at high speed due to the construction of a memory as described below.

Further, if the words constituting the fuzzy set are aligned in the memory with respect to the elements, an algorithm similar to that of the conventional computer is usable. In this case, the element operation unit 1 carries out a comparison operation of the elements, and the grade operation unit 2 carries out the min operation. The output of the operation of the grades may be controlled in accordance with the result of the comparison operation of the elements. That is, if the elements are coincident with each other (ea(i)=eb(j)), the operation result of grade (ga(i) min gb(j)), is output, and if they do not coincide with each other, a code of "no operation result" is output. Further, if a flag in the operation unit reflects the result of the comparison operation, a processing for which three steps of the comparison of the elements, (the operation of the grades and the operation of the counter) are required in the prior art can be carried out using only one operation, and this makes the execution still faster. If a data input buffer is provided and data is supplied through DMA transfer, fuzzy set operations can be carried out through a simple repetitive processing.

In a case of executing a monadic operation, the operation may be carried out without using one of input registers, for example, the input register 5.

An operation between a fuzzy set and a constant value is carried out using an internal register (not shown). For example, this corresponds to a case where the fuzzy set is cut out using a constant value. The internal register receives an output of the operation unit or a value of a data buffer, and stores it. The value stored in the internal register can be supplied to the operation unit in place of a value of an input register by a bus switch (not shown) between the input register and the operation unit.

As described above, the element operation unit 1 and the grade operation unit 2 have an ordinary function of an arithmetic and logic unit (ALU), however, it is sufficient to treat only a membership value of the fuzzy set for the grade operation unit 2, so that the device may be so designed that an operation of t-norm, t-conorm, particularly an operation of maximum value and minimum value can be executed at high speed. With respect to the element operation unit 1, only the function of the ordinary ALU may be provided.

A memory for a fuzzy set which is a second embodiment of this invention will be next described. In this embodiment, this invention is applied to a storage unit constituting a computer, particularly to a storage unit constituting a main storage unit of the computer.

Figure 7:
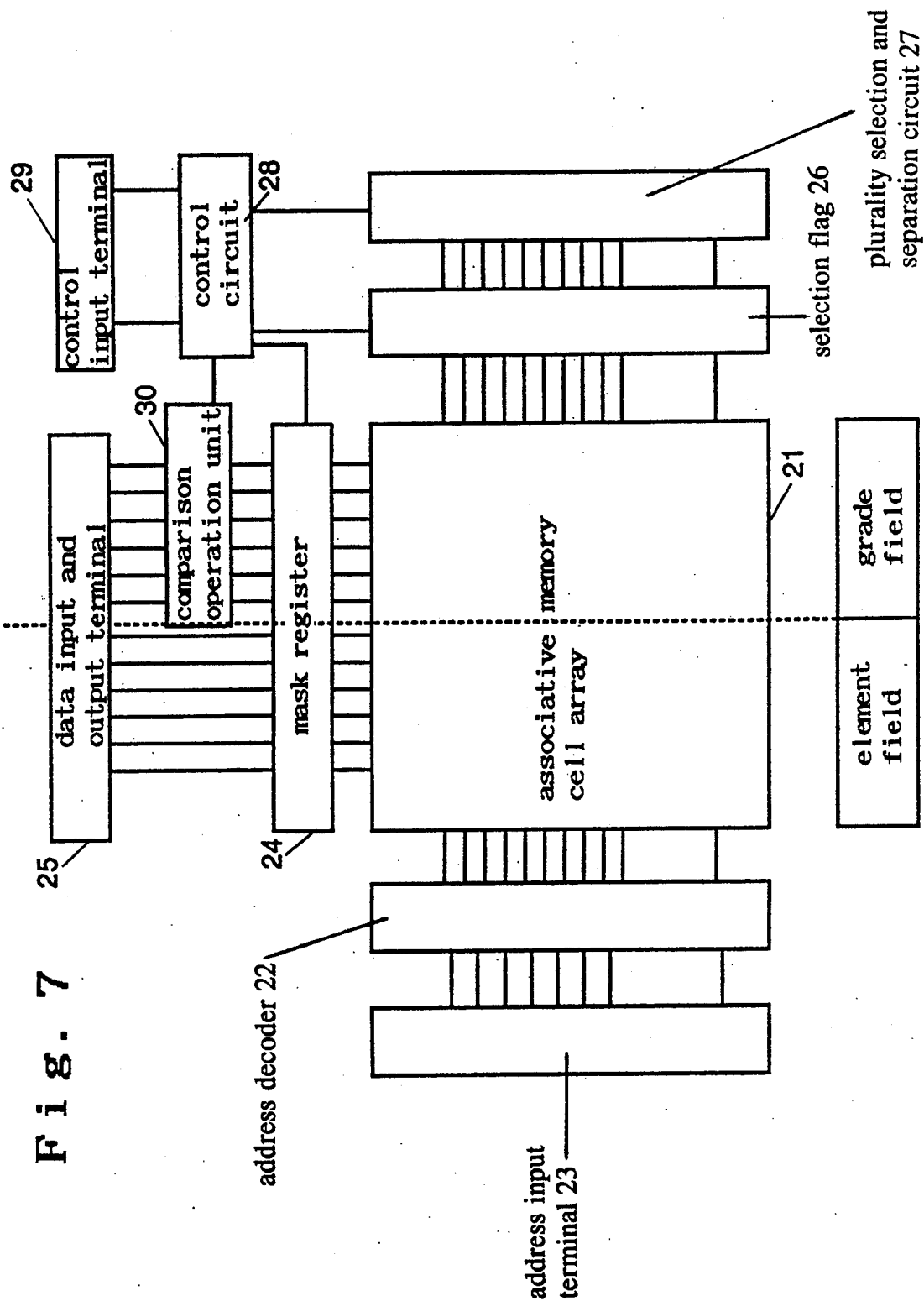
FIG. 7 is a block diagram of the inner construction of a fuzzy set memory according to a second embodiment of this invention.

The inner construction of the memory will be described with reference to FIG. 7. In FIG. 7, an associative memory cell array 21 comprises plural associative memory cells, and each associative memory cell comprises an ordinary memory cell equipped with an EXNOR circuit so that coincidence detection between the storage content and the external input can be performed at a memory cell level. This associative memory cell receives input and output in word units and an address is assigned to the associative memory for each word unit. A specific word can be accessed by supplying an address to the address input terminal 23. The address supplied to the address input terminal 23 is interpreted by the address decoder 22 to access the specific word in the associative memory cell. The data input and output is carried out through the data input terminal 25, and the selection flag 26 and the plurality selection and separation circuit 27 are provided to access the data in accordance with its contents. The selection flag 26 has a flag for each word, and sets the flag for words when the data supplied to the data input and output terminal 25 is coincident with the words in a search read-out operation.

The plurality selection and separation circuit 27 judges whether the flag representing coincidence is set in the selection flag 26, and generates addresses for words whose flag is set. The output of one pertinent word or the successive output of the pertinent words can be specified. A mask register 24 is a register having the same data width as the associative memory cell 1, and used to specify bit positions for data collating. It carries out a collating operation for only a bit for which "1" is set in the register, and does not carry out the collating operation for a bit for which "0" is set in the register. The comparison operation unit 30 carries out a comparison operation between the grade fields of the data at the data input and output terminal 25 and the data read out from the associative memory cell 21, and the comparison result is output to the control unit 28.

Similar to the operation unit of the first embodiment of this invention, the data which is treated by the memory of this invention is a word comprising an element of the universal set of a fuzzy set and a grade corresponding to the element. That is, as shown at the lower side of the figure, the whole of the word is divided into an element field and a grade field. In this embodiment, information on a label of the fuzzy set is not managed in the memory. Therefore, when plural fuzzy sets are treated, the information must be managed by dividing an address space or providing plural banks.

Next, the operation of the memory for the fuzzy set according to this embodiment will be described. The operation mode is divided into a write-in mode and a read-out mode. With respect to the read-out mode, a searching operation can, in accordance with the contents of stored data, be carried out like a conventional content address memory. In a case where an element of a fuzzy set is supplied to obtain a grade corresponding to the element, this searching operation in accordance with the content is used. A searching operation in accordance with the element is specified for the control input terminal 29, and an element to be searched is supplied to the element field of the data input and output terminal 25. Through action of the control unit 28, "1" is set for only bits corresponding to element field in the mask register 24, and no collating judgment is carried out for bits corresponding to grade field. As described later, an unique storage is carried out for the elements, and thus coincidence is obtained once at maximum through the searching result. Accordingly, the address for the pertinent word is generated from the plurality selection coincidence circuit, and data can be read out of the data input and output terminal 25.

As a result, it is not required to successively scan the elements in order to obtain a grade corresponding to a given element of the fuzzy set, and the data can be read out at high speed through only one memory access.

For the write-in operation, there are provided two modes, that is, a write-in mode based on address specification, and a write-in mode using a coincidence searching operation for elements. In the write-in mode based on the address specification, data supplied to the data input and output terminal is written in at a specified address similarly in an ordinary random access memory. In the write-in mode using the coincidence searching operation, a word comprising an element to be stored into the data buffer and a grade is first supplied to the input and output terminal 25, and a search write-in instruction is given to the control input terminal 29. At this time, similarly in the search read-out operation, "1" is set to only bits corresponding to element field in the mask register, and bits corresponding to the grade field are not subjected to a collating judgment. At a first cycle, a word having the same element as a data to be written in is searched. If no pertinent word exists as a result of this searching operation, the plurality element selection unit 27 outputs an inconsistency signal, and the data to be supplied to the data input and output terminal 25 is newly stored. If a pertinent word exists, the plurality element selection unit generates the address of the pertinent word to read out the data of the pertinent address. The comparison operation unit 30 carries out a comparison operation between the data of grade fields of the read-out data and the data supplied to the data input and output terminal 25. This result is judged by the control unit 28 again to renew the data only when the data supplied to the data input and output terminal 25 is larger than the read-out data. Through this operation, the data becomes unique in the memory with respect to the elements, and this uniqueness is maintained even after plural inputs are supplied for the same element, as in the case of extension principle operation. For example, when data are supplied in order of {0.3/4}, {0.7/2}, {0.9/4}, {0.4/2}, the grade for the element "4" is 0.9, and the grade for the element "2" is 0.7.

The memory of this embodiment is effective for a case where pairs of element and grade are successively supplied like a result of the extension principle operation by the operation unit of the first embodiment, and the assembly of these pairs is treated as a new fuzzy set.

Further, if a part of the construction of the first embodiment is modified to add a circuit to each word in a part of the associative memory cell which corresponds, to the element field, the maximum or minimum word can be obtained for the element field of a stored data when the search read-out operation is carried out.

Using this construction, the speed of the operation of the maximum value and the minimum value on the elements can be set to a speed which is not dependent on the number of words, but on the width of the word. Accordingly, when words contained in a fuzzy set are successively read out, words which are randomly stored can be aligned and read out in order of the elements at high speed. Therefore, by temporarily storing the operation result on a way of an operation on the fuzzy set and outputting it when the operation is completed, it can be used to obtain a result which is aligned with respect to the elements. Accordingly, this construction is excellently used as a working memory which is closely connected to the operation unit.

Figure 8:
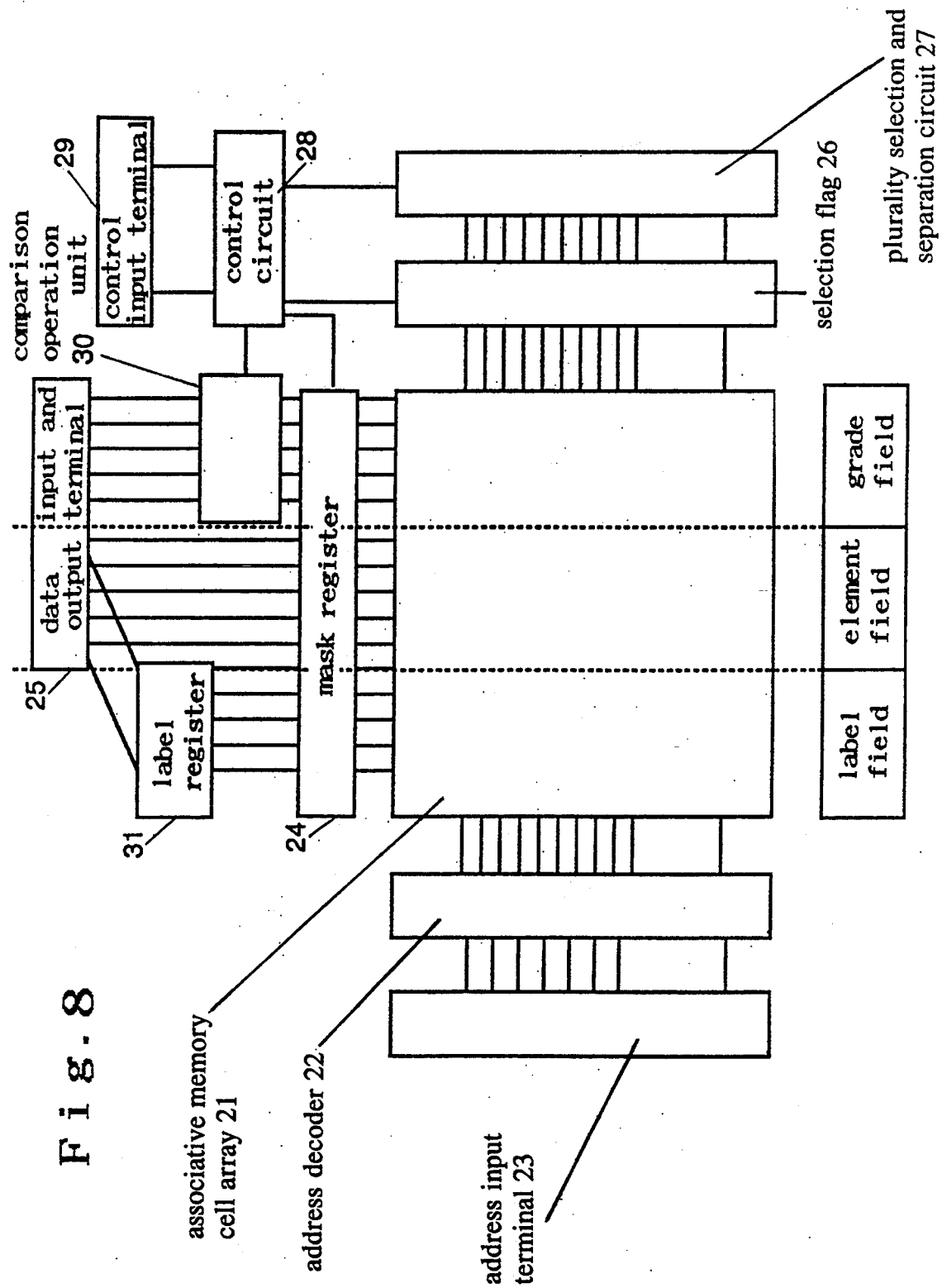
FIG. 8 is a block diagram of the inner construction of a fuzzy set memory according to a third embodiment of this invention.

Next, a third embodiment of this invention will be described referring to FIG. 8.

The basic construction of this embodiment is identical to that of the second embodiment, except for the word construction in the data input terminal 25, the mask register 24 and the associative memory cell 21, and the addition of a label register 31 for storing a value corresponding to a label field. That is, a word to be stored by the memory is different from that of the second embodiment, and it has a label field in addition to the element field and the grade field. This label field keeps a number for identifying fuzzy sets by its value. The same label is assigned to data contained in the same fuzzy set.

The write-in operation of the data of this embodiment is substantially similar to that of the second embodiment, however, these embodiments are different in that a value of a label field is provided. The value of the label field can be supplied from the data input terminal together with data of another field. However, in this embodiment, by providing a label register 31 inside and equipping the control unit 28 with an exclusively-used instruction for carrying out an altering operation of this register, only the data of the element field and the grade field are input and output at an ordinary data access time.

At the read-out time, two modes can be used. One is a read-out mode based on only a value of a label field, and the other mode is a read-out mode based on values of the label field and the element field. The latter read-out mode based on the values of the label field and the element field is an operation which is substantially common to the read-out operation of the second embodiment, and it is different from the second embodiment in that the searching operation is carried out on the basis of the coincidence the label field and the element field in this embodiment while the searching operation of the second embodiment is carried out on the basis of the coincidence of the element field.

In the read-out mode based on only the label field, all data contained in a specific fuzzy set are searched and successively read out to obtain a specified fuzzy set.

In this embodiment, all the words have label information for identifying fuzzy sets, plural fuzzy sets can be simultaneously stored. This embodiment is suitable for a large-capacity storage unit for storing data, while the second embodiment is suitable for a memory for temporarily storing an operation result.

Next, a memory for fuzzy set processing according to a fourth embodiment of this invention will be described with reference to the drawings. In this embodiment, unlike the three embodiments as described above, only the grade values of a fuzzy set are treated, and the grade values of the same fuzzy set are aligned at serial addresses. This is because only fuzzy set operations are intended to be carried out at high speed and thus no operation is carried out for element values. Considering the universal set to be fixed, no confirmation is made to the matching of the elements in the operations, and fuzzy set operations can be carried out scanning the memory by successively altering offsets of addresses.

Figure 3:
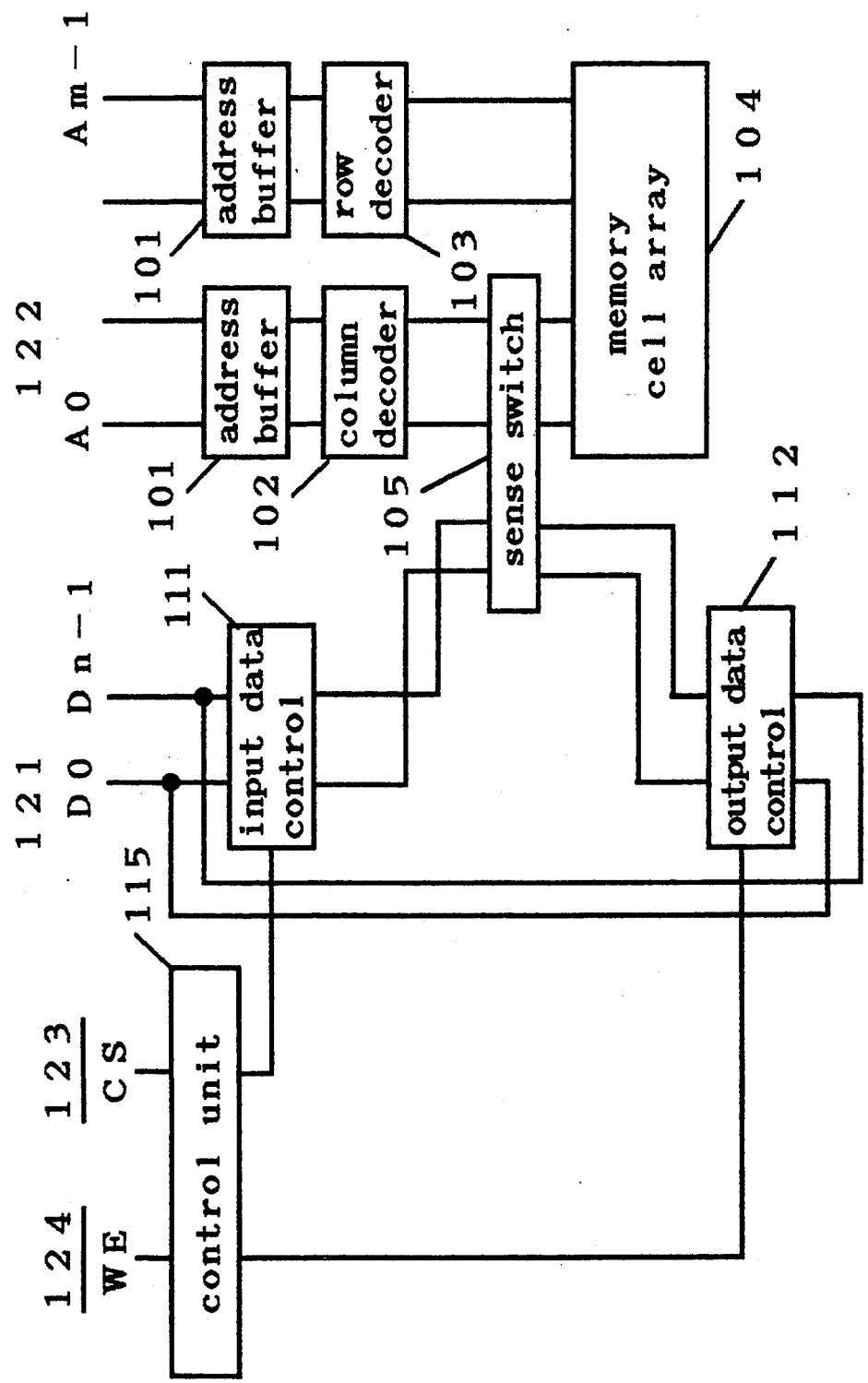
FIG. 3 is a block diagram of the construction of a conventional memory.
Figure 4:
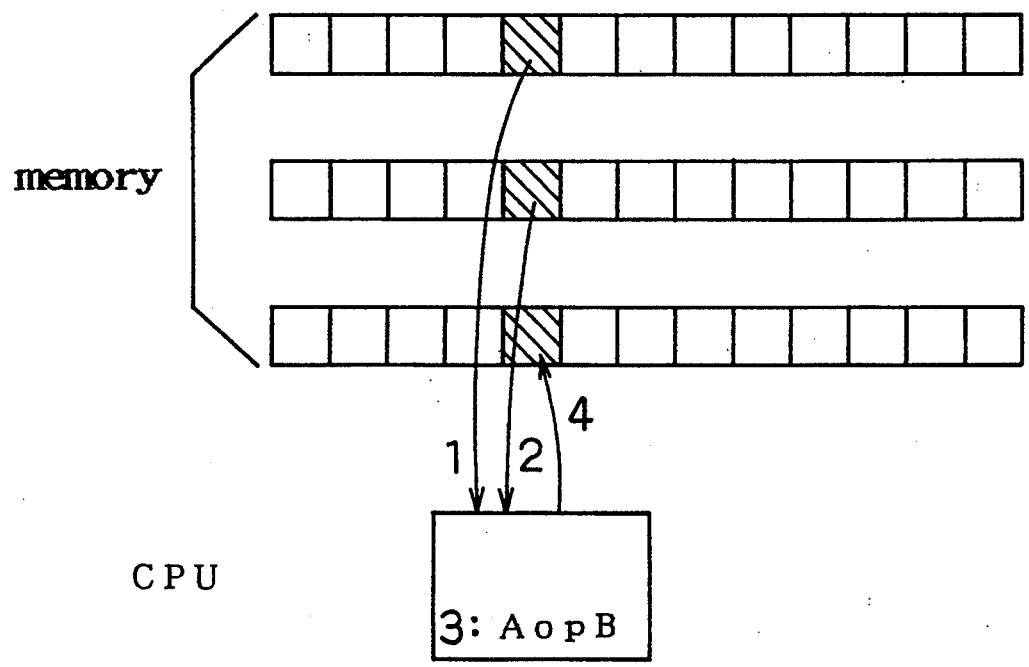
FIG. 4 is a diagram showing flow of an operation of the computer using the conventional memory.
Figure 5:
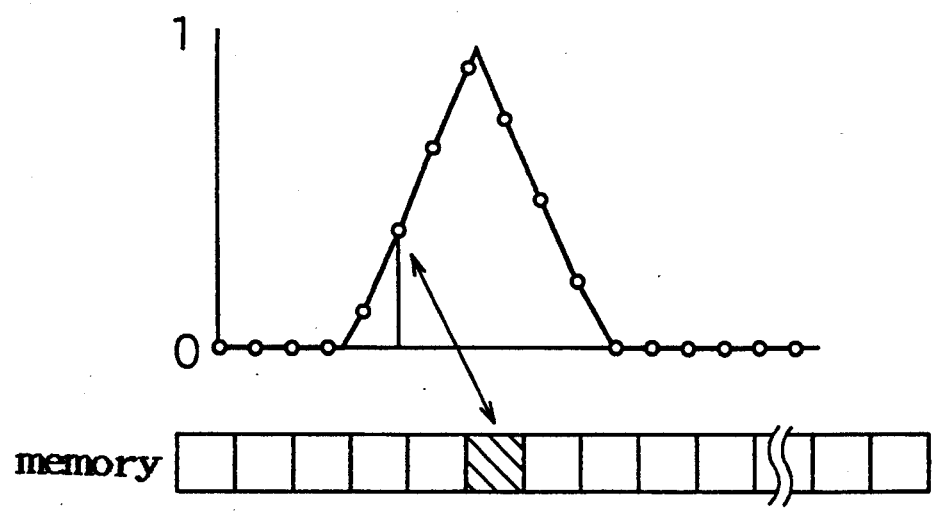
FIG. 5 is a diagram for the representation method of the fuzzy set in the computer.
Figure 9:
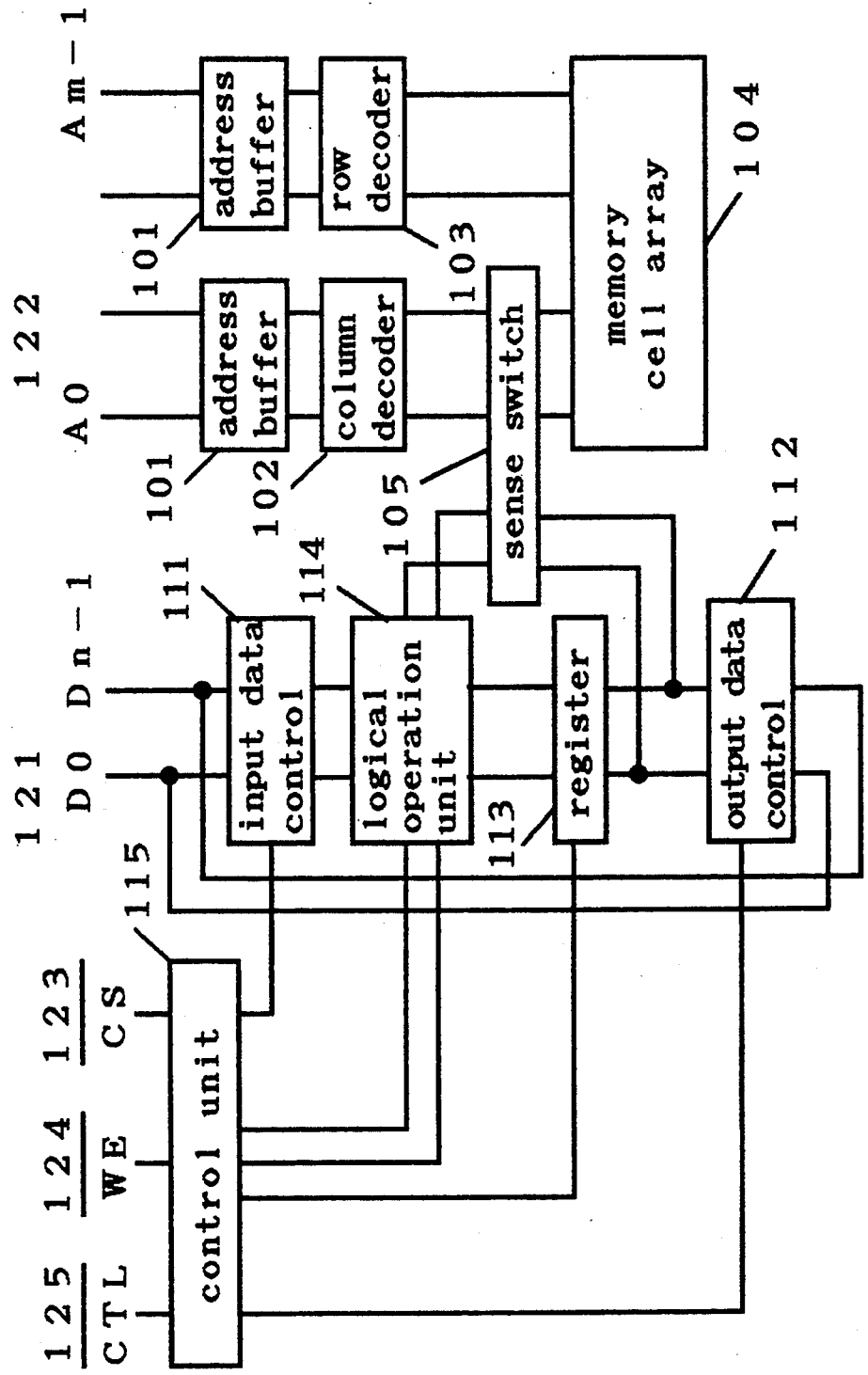
FIG. 9 is a block diagram of the construction of a memory of a fourth embodiment of this invention.

FIG. 9 is a block diagram of this embodiment in which this invention is applied to a static RAM. In FIG. 9, the basic part of this embodiment is similar to that of the conventional memory as shown in FIG. 3. The same elements are represented by same reference numerals, and thus the detailed description thereof is eliminated. Unlike the conventional memory, this embodiment is newly equipped with a register 113 for temporarily storing a content read from a memory cell array 104 and a logical operation unit 114 for carrying out a logical operation between the content of the register and the data supplied to the data input and output terminal, and equipped with a control terminal 125 for controlling the operation of the logical operation unit 114. The operation of the control unit 115 is shown in a table 2 unlike the conventional memory.

TABLE 2

| CS | WE | CTL | Stage | Input Data Control | Output Data Control | Operation Unit | Register |
|---|---|---|---|---|---|---|---|
| H | * | * | — | — | — | — | — |
| L | H | H | — | Disable | Enable | Disable | — |
| L | L | H | 1 | Disable | Enable | Disable | Latch |
|   |   |   | 2 | Enable | Disable | Operation | Output |
|   |   |   | 3 | Enable | Disable | Operation Result Output | — |
| L | * | L | — | Enable | Disable | Operation Switching | — |

The operation of this embodiment will be hereunder described mainly for the operation of the control unit 115. In this embodiment, the same operation as the conventional memory is carried out in the read-out operation, however, the write-in operation is carried out as follows.

The write-in operation is divided into three stages. When the address terminal 122 is supplied with an address and the chip select terminal 123 and the write-enable terminal 124 are supplied with "L", a first state starts to carry out a read-out operation from the memory cell array. Like the read-out operation of the conventional memory, the input data control 111 is switched to a disable state and the output data control 112 is switched to an enable state, so that the data is read out from the memory cell array 104 through the sense switch 105. This read-out data is latched to the register 113. At a second stage, the logical operation unit 114 carries out a predetermined logical operation between the data supplied to the data input terminal 121 and the data latched in the register 113. At a third stage, the result of the logical operation is written in the memory cell array 104.

As a whole, this operation acts as follows: the result of the logical operation between the data which is newly supplied to the data input and output terminal 121 and the data which has been already stored at the address concerned is stored again. The switching operation of each stage is controlled in accordance with a timer inside of the logical operation unit.

Three operations of a maximum value operation, a minimum value operation and a non-operation are prepared. Each of these operations executes the following operations.

| Maximum value operation | MEM ← IN max REG |
| Minimum value operation | MEM ← IN min REG |
| Non-operation | MEM ← IN |

Here,

| IN | data supplied to the input terminal |
| REG | value of register |
| MEM | data supplied to the memory cell array |

Each or all of these operations can be realized by a simple circuit, and such a circuit does not require a large chip area. In addition, the operation is carried out at high speed. Therefore, if a high-speed memory circuit is used, the operation as described above can be carried out in a range of a write cycle of the conventional memory.

When the operation is set to the non-operation, the data supplied to the data input and output terminal 121 is directly input to the memory cell array 104. In this case, the same operation as the conventional memory is carried out.

The kind of the logical operation is controlled using the control terminal 125. The control terminal 125 is kept to "H" in the normal write-in and read-out operations to the memory. However, when the control terminal 125 is supplied with "L", the control unit carries out a control operation of the logical operation unit to switch the kind of the operation. That is, when the chip select terminal 123 is supplied with "L" and the control terminal 125 is supplied with "L", the input data control 111 is kept to the enable state and the output data control 112 is kept disabled, the kind of the operation which is carried out in the logical operation unit 114 is selected in accordance with the data supplied to the data input and output terminal 121. The control terminal is used as one of address terminals which have been used for the conventional memory. Therefore, only substantially half of an address space is sufficient, and thus the storage capacity is reduced. Therefore, the fuzzy set computer can be constructed without altering an external hardware by replacing a memory of an existing computer.

Next, the switching operation of the kind of the operation will be described. The most significant bit of the address terminal of the conventional memory is used as a control terminal. If the address space of the conventional memory is 64 K bytes from $0 \times 0000$ to $0 \times FFFF$, the effective address space of this embodiment is 32K bytes from 0×8000 to 0×FFFF. All accesses for the space from 0×0000 to 0×7FFF means the switching of operations.

For example, no operation is set when the write-in operation of data of 0×0000 is carried out for an address 0×0000, and the maximum value operation is set when data of 0×0001 is supplied. This operation can be controlled by rewriting a register or a flag inside of the logical operation unit 114 in accordance with a signal supplied to the data input terminal when a signal for switching the operation is supplied from the control unit 115 to the logical operation unit 114. Accordingly, the switching operation of the kind of the operation can be realized as a write-in operation of the data for a specific address space. Therefore, the high-speed processing of the fuzzy set operation can be simply realized without altering the construction of the computer by using the memory of this embodiment in place of the conventional memory and altering only the construction in a software level.

The processing flow when the fuzzy operation is carried out in the computer constructed with the memory of this embodiment is as follows. In a case where an intersection set of two fuzzy sets FA and FB is stored in FC, representing the address of an n-th element of a fuzzy set FA by FA(n), the kind of the operation is set to the non-operation $$FA(1) -> FC(1)$$
$$FA(2) -> FC(2)$$
$$\vdots$$
$$FA(n) -> FC(n)$$

the operation is set to the minimum value operation $$FB(1) -> FC(1)$$
$$FB(2) -> FC(2)$$
$$\vdots$$
$$FB(n) -> FC(n)$$

Figure 10:
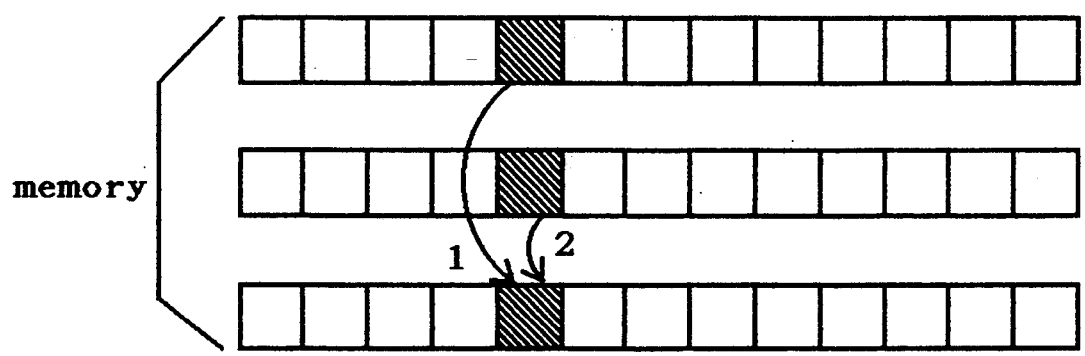
FIG. 10 is a diagram showing the flow of the operation a computer using of the fourth embodiment.

Here, 'X -> y' represents that the content of an address X is written at an address Y. If the number of elements of each fuzzy set is large, a time required for setting the kind of the operation is negligible, and the transmission amount between memories is 2*n. This is because as shown in FIG. 10, the operation is carried out using only two transmission proceedings between the memories in which a first operand is transmitted to a target address (1), and a second operand is transmitted to a target address (2) while omitting the transmission between the CPU and the memory. The transmission between the memories can be implemented at high speed without imposing a load on the CPU by using a DMA controller.

Figure 11:
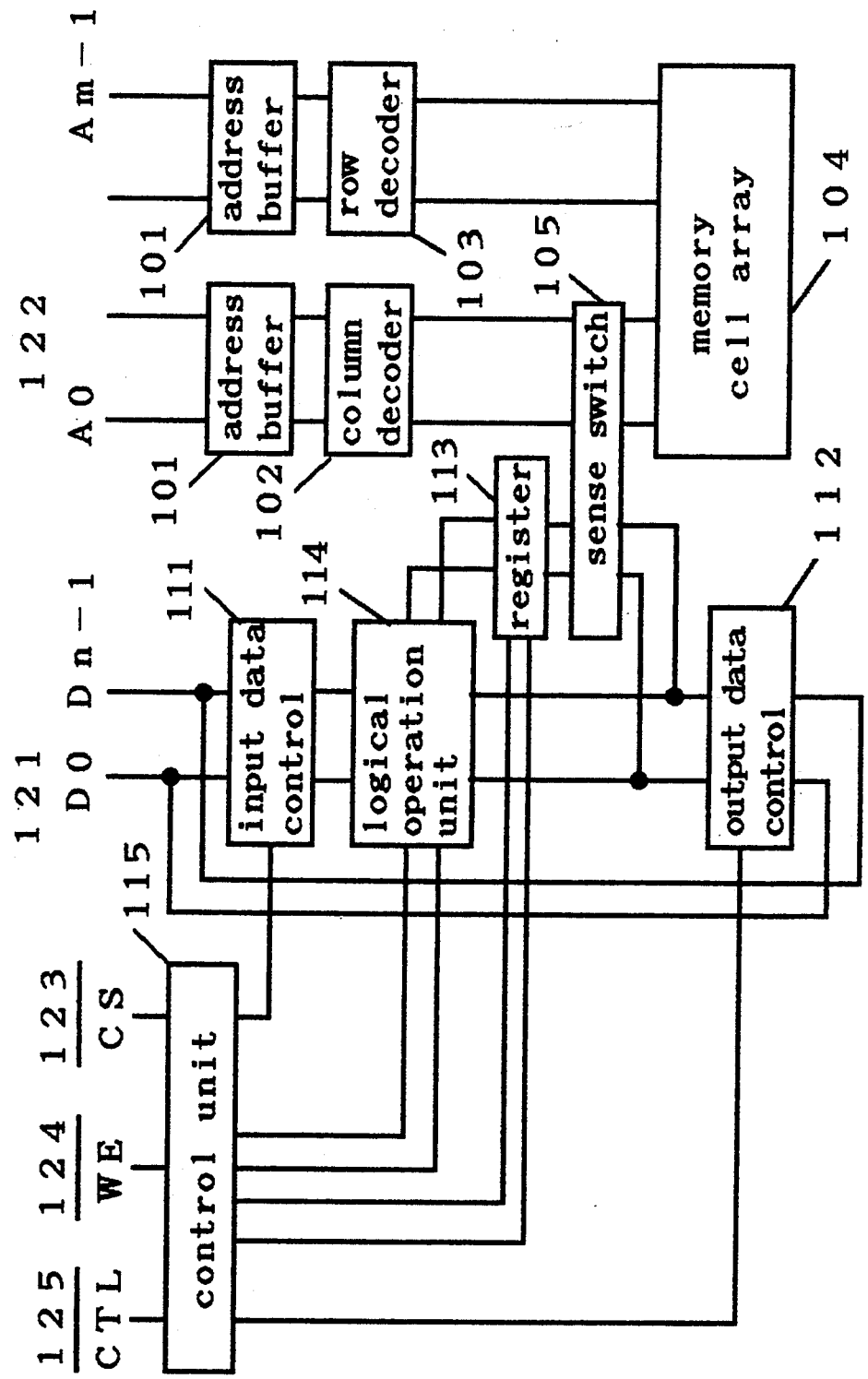
FIG. 11 is a block diagram of the construction of memory of a fifth embodiment of this invention.

Next, a fifth embodiment of this embodiment will be described. FIG. 11 is a diagram of a memory of the fifth embodiment according to this invention.

The basic construction of this embodiment is identical to that of FIG. 9, and the description thereof is omitted from the following description except for only different points. In this embodiment, the logical operation unit 114 carries out the logical operation between the data read out of the memory cell array and the data supplied to the data input and output terminal, and is used to temporarily store the output from the logical operation unit 114. The control unit 115 is equipped with a similar one, and the operation thereof is shown in a table 3.

TABLE 3

| CS | WE | CTL | Stage | Input Data Control | Output Data Control | Operation Unit | Register |
|---|---|---|---|---|---|---|---|
| H | * | * | — | — | — | — | — |
| L | H | H | — | Disable | Enable | Disable | — |
| L | L | H | 1 | Disable | Enable | Disable | — |
|   |   |   | 2 | Enable | Disable | Operation | Latch |
|   |   |   | 3 | Enable | Disable | Disable | Output |
| L | * | L | — | Enable | Disable | Operation Switching | — |

That is, the write-in operation is similarly divided into the three stages, and when the chip select terminal 123 and the write-enable terminal 124 are supplied with "L", the first stage first start to carry out the read-out operation from the memory cell array. The input data control 111 is switched to the disable state and the output data control 112 is switched to the enable state to read out the data from the memory cell array 104 through the sense switch 105. At the second stage, the data read out of the first stage is directly supplied to the logical operation unit 114 to execute the logical operation, and the operation result of the logical operation is latched by the register 113. Finally, at the third stage, the content of the register 113 is written in a pertinent address of the memory cell array 104.

As a result of the operation as described above, like the fourth embodiment, the result of the logical operation between the data newly supplied to the data input and output terminal 121 and the data stored in the address concerned is stored again.

In the above two embodiments, one of the address terminals of the conventional memory is used in place of the control terminal. However, an exclusively-used terminal may be used as a control terminal. When the exclusively-used terminal is provided, a small part of the address space is allocated to a control terminal of each memory in a level of a module containing plural memories to enable the address space to be effectively used. This construction is effective in a case where the memory is used on a module basis.

Likewise, one of the decoding results of the addresses can be allocated to the control terminal to allocate to the input of the control terminal one of the address spaces assigned to the memory. In this construction, most of memory space can be allocated to storage, so that the use efficiency of the memory space is high. However, a specific treatment are required for addresses which is allocated for control, and thus attention must be paid to the formation of software.

In the two embodiments as described above, the kinds of the operations are set to the maximum value operation, the minimum value operation and the non-operation. This combination is suitable for execution of the fuzzy inference of the Max-Min method, but for a different inference method, it is effective to use another combination. For example, in a case of using an inference of Max-Product method, a product operation may be added to the kinds of the operations which are executed in the logical operation unit.

These embodiments are examples where this invention is applied to static RAMs. However, this invention is applicable to a memory having another construction such as a dynamic RAM, and it is needless to say that the same effect can be obtained.

Figure 12:
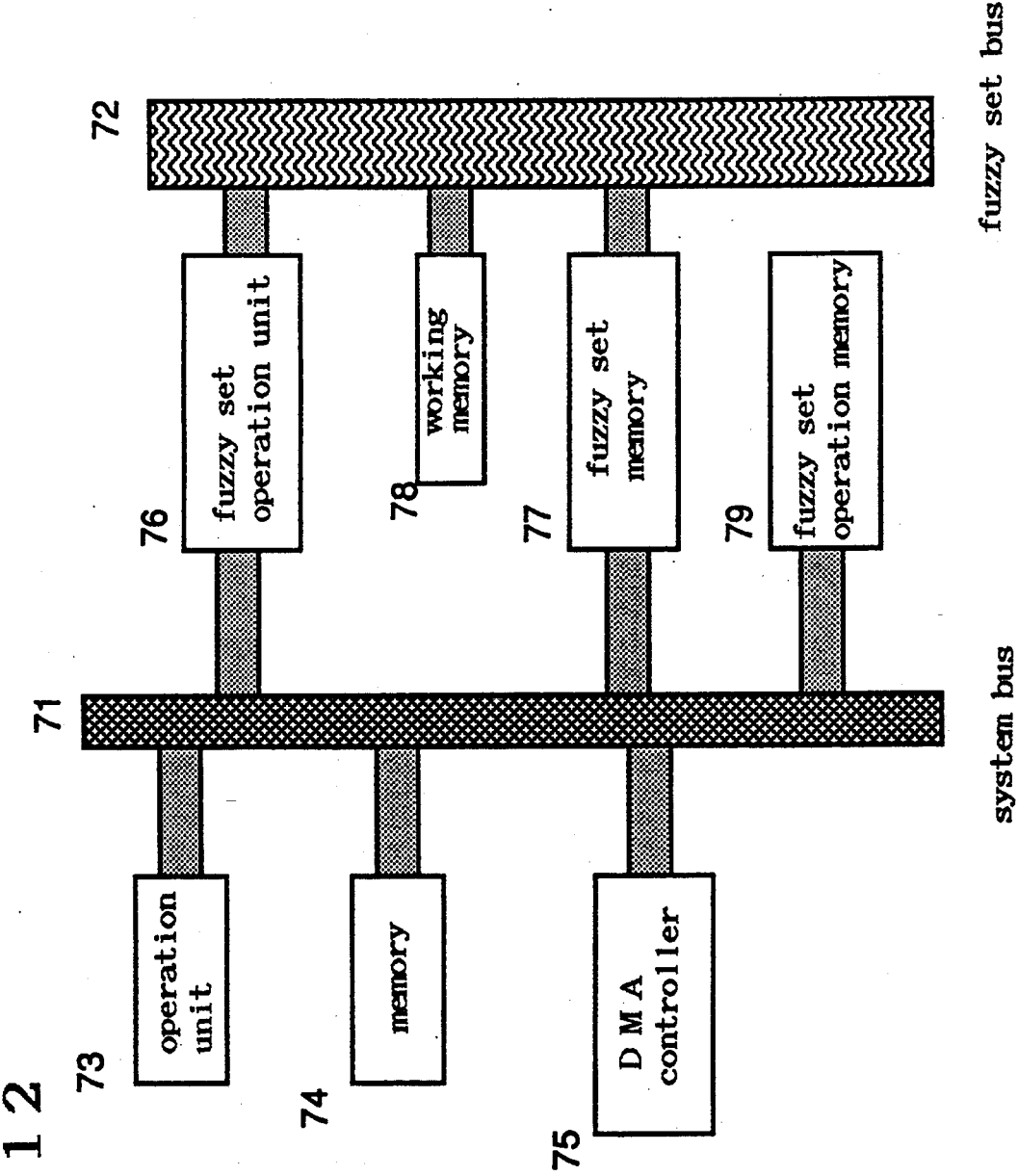
FIG. 12 is a diagram showing the construction of a fuzzy set computer of a sixth embodiment of this invention.

Next, a sixth embodiment of a computer which is constructed using the fuzzy set operation unit and the memory as described above will be hereunder described. FIG. 12 is a schematic diagram of the construction of the computer according to this invention.

In FIG. 12, a system bus 71, an operation unit 73, a memory 74 and a DMA controller 75 are similar to those of a computer system which is ordinarily used. A fuzzy set bus 72 is an exclusively-used bus having a word width which comprises a pair of an element of the universal set of a fuzzy set and a grade corresponding to the element like the third embodiment. On the bus are provided a fuzzy set operation unit 76 for which the fuzzy set operation unit of the first embodiment is used, a working memory 78 for which the fuzzy set storage unit of the second embodiment is used, a fuzzy set memory 77 for which the fuzzy set storage unit of the third embodiment is used, and the fuzzy set operation memory 79 shown in the fourth and fifth embodiments. Of these elements, the fuzzy set operation 76 acts as a co-processor of the operation unit 73 and connected to the system bus 71, so that it is provided with an instruction from the system bus 71. The fuzzy set operation unit 76 has therein the fuzzy set operation unit as shown in the first embodiment, and is equipped therein with a control circuit which acts to receive a macro-instruction from the operation unit 73 and transmit it to the instruction of the fuzzy set operation unit. The fuzzy set memory 77 is also connected to the system bus to carry out data transfer. In order to heighten the efficiency of data exchange, the width of the fuzzy set bus may be set to integer times of that of the system bus or to such a value that the inverse relation thereof is satisfied.

A typical system operation will be hereunder described.

As a preparation before the operation is carried out, registration of data to the fuzzy set memory is required. The data is transmitted from the memory 74 managed by the operation unit 73 to the fuzzy set memory 77. This transmission can be executed using the DMA controller 75. At the start of the operation, an instruction is issued from the operation unit 73 to the fuzzy set operation unit 76. This instruction comprises the name of fuzzy sets and the kind of the operation for the fuzzy sets. This instruction is decomposed into an instruction for operating data stored in the fuzzy set memory 77 inside of the fuzzy set operation unit 76. When an operation between two fuzzy sets is specified, the data constituting one of the fuzzy sets are read out from the fuzzy set memory 77 to the working memory 78. Similarly, the read-out operation of the other fuzzy set to the working memory 78. These read-out operations are carried out for different banks, respectively. The operation between the two fuzzy sets is carried out in such a manner that the working memory 78 is accessed from the fuzzy set operation unit 76. The result is successively stored into another bank of the working memory 78. The data accumulated in the working memory 78 is read out and returned to the fuzzy set memory 77 when all of necessary operations are required. Through this operation, one cycle operation is terminated.

Figure 14:
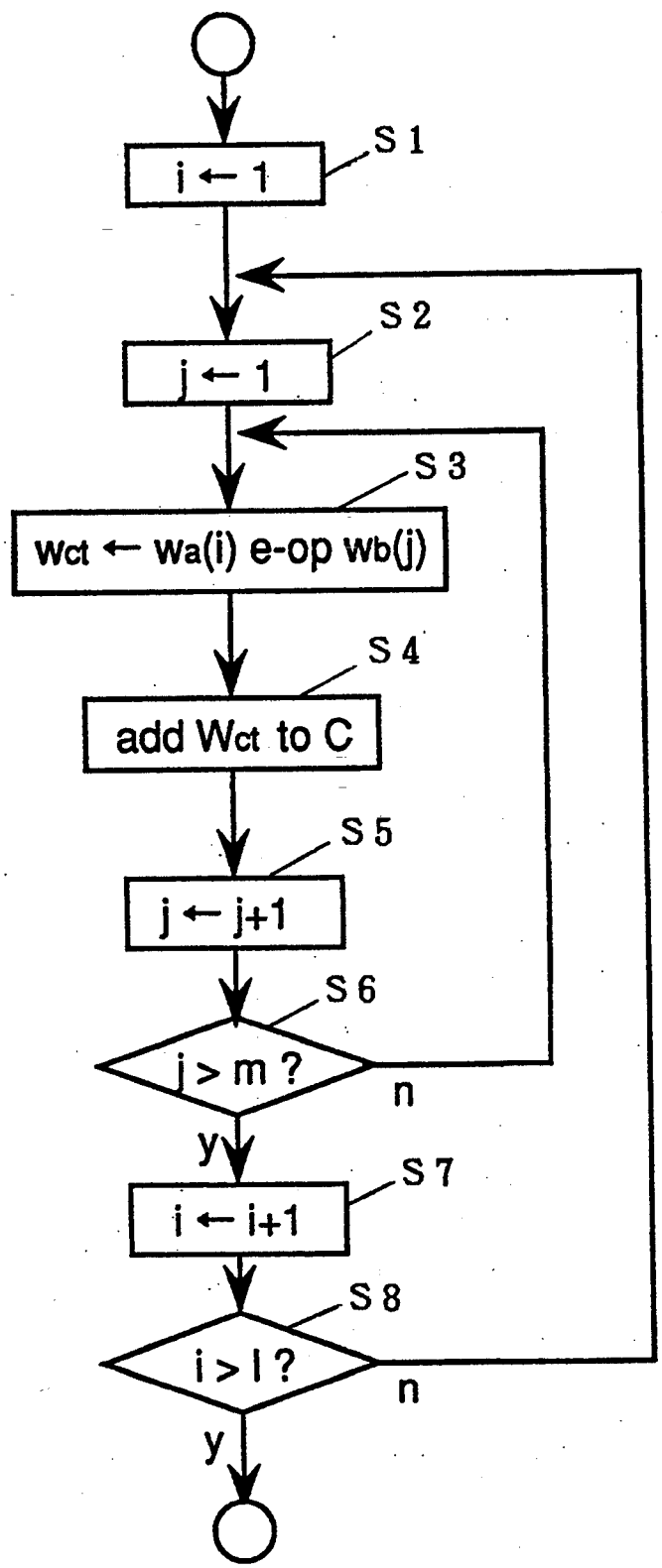
FIG. 14 is a flowchart for the extension principle of the computer of the sixth embodiment of this invention.

The concrete operation of the fuzzy set operation unit 76 is carried out in accordance with a flowchart as shown in FIGS. 13 and 14. When an operation between the two fuzzy sets is specified, the operation is carried out for all combinations of words constituting the two fuzzy sets. The operation of each word is carried out by supplying an instruction to the inner fuzzy set operation unit. The operation inside of the operation unit is carried out as shown in the first embodiment. Addition of the operation result to a new fuzzy set is carried out using only a processing of transmitting data to the working memory because the memory of the second embodiment is used as the working memory, and thus higher improvement of the operation speed can be intended in comparison with the processing using the conventional computer.

The fuzzy set operation memory 79 is placed on the same memory space as the ordinary memory 74, and the access from the operation unit 73 is carried out using the DMA transmission. In this construction, the fuzzy set operation memory 79 takes over a portion of the fuzzy set operation instead of fuzzy set operation unit 78 to carry out an application requiring no extension principle operation such as a fuzzy control at high speed. The representation of fuzzy sets in this case is different from that when the fuzzy set operation unit 78 is used, and the values of grades are stored at serial addresses of the memory. The operations of the operation unit and the memory in this construction are carried out as shown in the fourth embodiment, and thus there is an advantage that the fuzzy set operation can be realized by only alteration of the simple construction.

When both of the extension principle operation and the fuzzy set operation are required to be executed at high speed. The following construction is considered. That is, the data representation of the fuzzy set operation memory 79 is set to the same as the fuzzy set operation unit 78, and a field for representing an element is provided. This construction should be used when a high speed is required with sacrificing an use efficiency of the memory.

In this embodiment, the fuzzy set bus is provided separately from the system bus. However, it may be designed that the fuzzy set operation unit is provided to the system bus without providing an exclusively-used bus. This construction has disadvantages that the width of the fuzzy set bus is restricted by the data width of the system, and that another element can not be driven when the fuzzy set operation unit is in operation. However, this construction has an advantage that the whole construction becomes simple.

Further, in this embodiment, the fuzzy set memory can be also accessed from the system bus. However, it may be designed that all memory space for fuzzy set can be accessed only through the fuzzy set operation unit. In this case, the constituting element for the fuzzy set processing is regarded as a back-end processor, and thus the function for fuzzy sets can be realized without greatly altering the whole construction of the computer.

As described above, according to this invention, The combination between an element of the universal set of a fuzzy set and a grade corresponding to the element is treated as a basic data unit in a computer system. In order to directly operate this data unit, the operation unit is equipped with the grade operation unit and the element operation unit, and each of these components is so constructed as to carry out the operation of the corresponding data field. In the memory, the associative memory cell array is used as a storage element, and the data search on the basis of the element can be carried out. That is, the construction thereof is made so that it is guaranteed that the data is unique with respect to the element in the memory space. Therefore, the number of instructions required for the operation of the fuzzy set operation and the execution time are reduced, and the fuzzy set operation can be carried at higher speed together with the fuzzy set operation and the operation based on the extension principle.

A part of the memories is so designed as to be equipped with a register for temporarily storing data read out from the memory cell, and the logical operation unit for carrying out the fuzzy logical operation between the data stored in the register and the data newly supplied as a write-in data in the memory write-in operation. Therefore, of the operations for fuzzy set, particularly fuzzy set operations for which high speed is required can be carried out in the same manner as the memory transmission. Particularly it is effective for three or more operands.

From these effects, the operation for fuzzy set can be carried out at high speed irrespective of its kind, and it can coexist with operations other than fuzzy sets.

Meanwhile the present invention in accordance with claim 5 or 6 is applicable to such arts other than the fuzzy set art.

What is claimed is:

1. A computer system having an arithmetic and logic device for processing, in accordance with a given instruction, data words serving as input data and output data, the data words each being divided into an element field with data representative of an element of a fuzzy set and a grade field with data representative of a grade corresponding to the element represented in the element field, said system comprising:
    an element operating unit for processing element field data,
    a grade operating unit for processing grade field data,
    an instruction decoder for interpreting a given instruction to supply a first instruction to said element operating unit and a second instruction to said grade operating unit,
    input registers for supplying element field data of input data to said element operating unit and grade field data of input data to said grade operating unit; and
    an output register for composing outputs from said element operating unit and said grade operating unit into an output data word, and for outputting the output data word as output data.

2. A computer system in accordance with claim 1, wherein the element operating unit performs a comparison operation.

3. A computer system in accordance with claim 2, wherein the element operating unit supplies a flag for indicating a result of the comparison operation.

4. A computer system in accordance with claim 1, wherein the element operating unit and the grade operating unit cooperate together to perform a t-norm operation.

5. A computer system in accordance with claim 1, wherein the element operating unit and the grade operating unit cooperate together to perform a t-conorm operation.

6. A random access memory unit, comprising:
    an address decoder for decoding an address supplied to an address terminal,
    a memory cell for storing data,
    a data input/output terminal for performing data input and output operations,
    a register for temporarily storing data read out of said memory cell,
    a logical operation unit for carrying out an operation with data stored in said register and data which is newly supplied as write-in data to said data input/output terminal, and for outputting the result of said operation to said memory cell, and
    a control unit with a control terminal for switching an operation of said logical operation unit in response to an input from an external source, wherein
    at a memory write-in time, the content of said memory cell stored at an address supplied to the address terminal is temporarily stored into said register to undergo the operation with data supplied to said data input/output terminal, the results of the operation being written into said memory cell.

7. A random access memory unit, comprising:
    an address decoder for decoding an address supplied to an address terminal,
    a memory cell for storing data,
    a data input/output terminal for performing data input and output operations,
    a logical operation unit for carrying out an operation with data stored in said memory cell and data which is newly supplied as write-in data to said data input/output terminal, and for outputting the result of the operation to a register,
    said register for temporarily storing the output of said logical operation unit, and
    a control unit and a control terminal for switching an operation of said logical operation unit in response to an input from an external source, wherein
    at a memory write-in time, a logical operation is carried out with the contents of said memory cell corresponding to an address supplied to the address terminal and the data supplied to said data input/output terminal, the results of said operation being temporarily stored in said register and then stored in said memory cell.

8. A random access memory unit in accordance with claim 7, wherein when a signal is supplied to the control terminal, the operation which is set in the logical operation unit is switched to another operation which is determined by data supplied to the data input/output terminal.

9. A storage unit for use in a digital computer system, comprising:
    an associative memory cell array for processing and storing input and output data as data words, said data words each having an element field with data representative an element of a fuzzy set and a grade field with data representative of a grade corresponding to the element, and for judging whether stored data words are coincident stored data words which at least partially coincide with a supplied data word,
    a plurality selection and separation circuit for outputting addresses of coincident stored data words, and
    a comparison operating unit for carrying out a comparison operation between the grade of a supplied data word and the grade of a data word read out of said associative memory cell, such that
    at a data read-out time, the associative memory cell array outputs coincident stored data words, and
    at a data write-in time, if there is a coincident stored data word, the comparison operating unit compares the grade of the grade field of the coincident stored data word with the grade of the grade field of the supplied data word, and if the grade of the grade field of the supplied data word is larger than the grade of the grade field of the coincident stored data word, the comparison operating unit replaces the grade of the grade field of the coincident stored data word with the grade of the grade field of the supplied data word and if there exists no coincident stored data word, the supplied data word is stored in the associative memory cell array as a new stored data word.

10. The storage unit in accordance with claim 9, wherein a part of said associative memory cell which corresponds to the element fields of stored data words is supplied with a judgement circuit for carrying out at least one of a minimum value judgement operation and a maximum value judgement operation, such that when stored data words are read out of the associative memory, the read out stored data words are output in order of magnitude of the value of the elements of their element fields.

11. A storage unit in accordance with claim 9, wherein the associate memory judges, in response to an external control signal, that a stored data word is coincident with the supplied data word when the element of the element field of the supplied data word coincides with the element of the element field of the stored data word.

12. A storage unit in accordance with claim 9, wherein the storage unit further includes a mask register for determining parts of the stored data words which must coincide with corresponding parts of the supplied data word for the stored data words to be judged as coincident stored data words by the associative memory cell array.

13. A storage unit in accordance with claim 12, wherein the storage unit further includes a control circuit, for controlling the operation of the mask register, and for controlling the replacement of the grade of the grade field of the coincident stored data word in response to a comparison result from the comparison operating unit.

14. A storage unit in accordance with claim 9, wherein the storage unit further includes an address input terminal and an address decoder for accessing a specific address of the associative memory cell array.

15. A storage unit in accordance with claim 9, wherein the storage unit further provides a selection flag for indicating when a stored data word has been judged a coincident stored data word by the associative memory cell array.

16. A storage unit for use in a digital computer system, comprising:

an associative memory cell array for processing and storing input and output data as data words, said data words each having a label field with data which identifies a fuzzy set, an element field with data representative of an element of the fuzzy set and a grade field with data representative of a grade corresponding to the element, and for judging whether stored data words are coincident stored data words which at least partially coincide with a supplied data word, a plurality selection and separation circuit for outputting addresses of label coincident stored data words, and a comparison operating unit for carrying out a comparison operation between the grade of a supplied data word and the grade of a data word read out of said associative memory cell array, such that at a data read-out time, the associative memory cell array outputs coincident stored data words, and at a data write-in time, if there is a coincident stored data word, the comparison operating unit compares the grade of the coincident stored data word with the grade of the supplied data word, and if the grade of the grade field of the supplied data word is larger than the grade of the grade field of the coincident stored word, the comparison operating unit replaces the grade of the grade field of the coincident stored data word with the grade of the grade field of a supplied data word, and if there exists no coincident stored data word, the supplied data word is stored as a new stored data word in the associative memory cell array.

17. A storage unit in accordance with claim 16, wherein the associate memory judges, in response to an external control signal, that a stored data word is coincident with the supplied data word when the label of the label field of the supplied data word coincides with the label of the label field of the stored data word, the element of the element field of the supplied data word coincides with the element of the element field of the stored data word, or the label of the label field of the supplied data word coincides with the label of the label field of the stored data word and the element of the element field of the supplied data word coincides with the element of the element field of the stored data word.

18. A storage unit in accordance with claim 4, wherein the storage unit further includes a mask register for determining parts of the stored data words which must coincide with corresponding parts of the supplied data word for the stored data words to be judged as coincident stored data words by the associative memory cell array.

19. A storage unit in accordance with claim 18, wherein the storage unit further includes a control circuit, for controlling the operation of the mask register, and for controlling the replacement of the grade of the grade field of the coincident stored data word in response to a comparison result from the comparison operating unit.

20. A storage unit in accordance with claim 4, wherein the storage unit further includes an address input terminal and an address decoder for accessing a specific address of the associative memory cell array.

21. A storage unit in accordance with claim 4, wherein the storage unit further includes a selection flag for indicating when a stored data word has been judged a coincident stored data word by the associative memory cell array.

22. A storage unit in accordance with claim 4, further including a label register for storing label data of the label field of the supplied data word, and for writing the label data into the label fields of data words stored in the associative memory.

23. A random access memory unit in accordance with claim 5, wherein when a signal is supplied to the control terminal, the operation which is set in the logical operation unit is switched to another operation which is determined by data supplied to the data input/output terminal.

* * * * *